US012013562B2

(12) United States Patent
McCracken, Jr. et al.

(10) Patent No.: US 12,013,562 B2
(45) Date of Patent: Jun. 18, 2024

(54) LUMINAIRE INCLUDING OPTICAL WAVEGUIDE HAVING HOLLOW CYLINDRICAL STRUCTURE FOR ILLUMINATING OPEN OR CLOSED SPACES

(71) Applicant: Eran New Product Development, LLC, Boca Raton, FL (US)

(72) Inventors: Edward R. McCracken, Jr., Cincinnati, OH (US); Eric Martin Frydendall, Denver, CO (US)

(*) Notice: Subject to any disclaimer, the term of this patent is extended or adjusted under 35 U.S.C. 154(b) by 24 days.

(21) Appl. No.: 18/047,183

(22) Filed: Oct. 17, 2022

(65) Prior Publication Data

US 2024/0125999 A1    Apr. 18, 2024

(51) Int. Cl.
  *F21V 8/00*    (2006.01)
  *F21S 8/00*    (2006.01)
  *F21Y 103/33*  (2016.01)

(52) U.S. Cl.
  CPC .............. *G02B 6/0036* (2013.01); *F21S 8/00* (2013.01); *G02B 6/0055* (2013.01); *G02B 6/0073* (2013.01); *F21Y 2103/33* (2016.08)

(58) Field of Classification Search
  CPC .................................................. F21Y 2103/33
  USPC .................................................. 362/615–617
  See application file for complete search history.

(56) References Cited

U.S. PATENT DOCUMENTS

| | | | |
|---|---|---|---|
| 7,665,866 B2* | 2/2010 | Mayer | F21V 7/04 362/241 |
| 8,382,347 B2* | 2/2013 | McCanless | F21V 15/01 362/249.02 |
| 8,998,478 B2* | 4/2015 | McCollum | G02B 6/0063 362/147 |
| 10,042,106 B2 | 8/2018 | Cree | |
| 2021/0088709 A1* | 3/2021 | Gismondi | F21V 29/70 |

FOREIGN PATENT DOCUMENTS

CH           715534 A1 *  5/2020

OTHER PUBLICATIONS

Machine English Translation on CH 715534 A1 (Year: 2020).*

* cited by examiner

*Primary Examiner* — Keith G. Delahoussaye
(74) *Attorney, Agent, or Firm* — Andrew C. Hess

(57) ABSTRACT

The present disclosure is directed towards a luminaire having an optical waveguide and a light source. The optical waveguide has a hollow cylindrical structure with a first surface and a second surface at the opposite ends of the cylindrical structure and an external surface and an inner surface extending between the first surface and the second surface. The light source illuminates the first surface of the optical waveguide. The external surface of the optical waveguide is constructed such that the light from the light source exits from the inner surface. The luminaire directs the light from the light source towards the nadir and prevents glare to the eyes of the people in the surrounding space.

20 Claims, 15 Drawing Sheets

LUMINAIRE INCLUDING OPTICAL WAVEGUIDE HAVING HOLLOW CYLINDRICAL STRUCTURE FOR ILLUMINATING OPEN OR CLOSED SPACES

CROSS-REFERENCE TO RELATED APPLICATIONS

Not Applicable.

STATEMENT REGARDING FEDERALLY SPONSORED RESEARCH OR DEVELOPMENT

Not Applicable.
The Names of the Parties to a Joint Research Agreement
Not Applicable.
File Via the Office Electronic Filing System
Not Applicable.
Statement Regarding Prior Disclosures by the Inventor or a Joint Inventor
Not Applicable.

BACKGROUND OF THE INVENTION

Field of the Invention

The present subject matter relates, in general, to a luminaire for illuminating open and closed spaces, and particularly to a luminaire with an optical wave guide.

Description of Related Art Including Information Disclosed Under 37 CFR 1.97 and 1.98

Lighting systems operate using various light sources such as incandescent lamp, fluorescent bulb, more particularly compact fluorescent lamp (CFL), halogen bulb, Light emitting diode(s) (LED), etc. Light sources may tend to produce an amount of luminance higher than the human eyes can adapt for a clear view. A lighting system with such output may cause glare which may be discomfortable for a person or may reduce visibility of a person. The glare may be more obtrusive for older people who may have reduced eye sight due to aging or for people who wear eyeglasses.

Of these light sources, LED(s) are more energy efficient, operate on low voltage, and have longer life span. In an LED a bright light emits from a pinpoint which causes hotspots i.e., irregularities in the pattern of light and further results in wide angle scattering.

To address these issues, conventional light sources are generally provided with reflectors and/or light guiding plates to direct the light in specific direction. Further, the light sources are provided with diffusers to evenly distribute the light reflected from a reflector or extracted from a light guiding plate. However, the existing systems or arrangements are inefficient in reducing the glare when the light source is installed overhead either in a closed space like a house, hall, auditorium, passageway, etc. or in an open space like a park, garden, ground, walkway, street, parking area, etc. The diffusers are additional components for the light to pass. Therefore, there is loss of light or optical efficiency. The diffusers further change the beam pattern, making much of the light uncontrolled and may provide a "blob" of light in all directions instead of uniform shaped beam.

U.S. Pat. No. 10,042,106 (Wilcox et al.) describes a luminaire having a plurality of optical waveguides for extracting light. These optical waveguides have planar surfaces and require multiple coupling arrangements which make the luminaire bulky, costly, and difficult to repair. Further, the optical waveguides with planar surfaces do not distribute light evenly, especially around the corners or the junctures of abutting planar wave guides.

In a lighting system, the nadir is defined as an angle that points directly downwards from the luminaire and referred as 0°. In other words, nadir is a vertical line in downward direction, and which is perpendicular to the horizontal plane of the luminaire. The Illuminating Engineering Society of North America (IESNA) has defined cutoff classifications for luminaire which is with reference to nadir and are generally referred as full-cutoff, cutoff, semi-cutoff, and non-cutoff.

In a full-cutoff luminaire, the luminous intensity at or above an angle of 90° above nadir is zero (0 candela), and the luminous intensity (in candelas) at or above a vertical angle of 80° above nadir does not exceed 10% of the luminous flux (in lumens) of the lamp(s) in the luminaire. In a cutoff luminaire, the luminous intensity does not exceed 2.5% of the luminous flux at or above an angle of 90° above nadir, and the luminous intensity at or above a vertical angle of 80° above nadir does not exceed 10% of the luminous flux. In a semi-cutoff luminaire, the luminous intensity does not exceed 5% of the luminous flux at or above an angle of 90° above nadir, and the luminous intensity at or above a vertical angle of 80° above nadir does not exceed 20% of the luminous flux. In non-cutoff luminaire, there is no candela limitation at or above a vertical angle of 80° above nadir. Reference: [https://www.lrc.rpi.edu/programs/nlpip/lightinganswers/lightpollution/cutoffclassific ations.asp]

The luminaire structure as described by Wilcox et al. extracts light outward and therefore, may be categorized as semi-cutoff luminaire. Thus, the luminaire of Wilcox et al. may not direct sufficient light at the nadir.

BRIEF SUMMARY OF THE INVENTION

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the disclosure to the precise forms disclosed in the following detailed description. Rather, the embodiments are chosen and described so that others skilled in the art may appreciate and understand the principles and practices of the present inventive subject matter.

In one aspect, the disclosure is directed towards a luminaire. The luminaire includes an optical waveguide and a light source. The optical waveguide has a hollow cylindrical structure with a first surface and a second surface at the opposite ends of the cylindrical structure and an external surface and an inner surface extending between the first surface and the second surface. The light source illuminates the first surface of the optical waveguide, the external surface of the optical waveguide is constructed such that the light from the light source exits from the inner surface.

In accordance with one implementation of the present disclosure the light source comprises at least one light emitting diode (LED).

In accordance with another implementation of the present disclosure the luminaire has a first layer that surrounds the external surface to the reflect the light towards the inner surface and a second layer that covers the second surface to reflect the light falling over the second surface. The layer may be a paint or a sheet.

In accordance with another implementation of the present disclosure the external surface is etched to form a plurality of light guiding points, the plurality of light guiding points direct the light towards the inner surface.

In accordance with another implementation of the present disclosure the optical waveguide is recessed in a housing. The housing may have a first end and a second end opposite to the first end, the first end is closed. The first surface of the optical waveguide and the light source are positioned towards the first end. The housing further includes a control module to control and supply power to the light source. Further, the layer is an integral part of the housing.

In accordance with another implementation of the present disclosure the housing may include a cover plate disposed over the light source and an external sealant and an internal sealant to seal the light source between the optical waveguide and the cover plate.

In accordance with another implementation of the present disclosure the housing may be mounted on a post or on a surface through an arm. Alternatively, the housing may be suspended from a ceiling.

In another aspect, the disclosure is directed towards a luminaire comprising a housing, an optical waveguide recessed in the housing, and a plurality of light emitting diodes (LEDs). The optical waveguide has a hollow cylindrical structure with a first surface and a second surface at the opposite ends of the cylindrical structure and an external surface and an inner surface extending between the first surface and the second surface. The plurality of LEDs illuminates the first surface of the optical waveguide. The external surface of the optical waveguide is constructed such that the light from the plurality of LEDs exits from the inner surface.

In another aspect, the disclosure is directed towards a lamp post. The lamp post includes a housing, a light source provided in the housing, and an optical waveguide. The optical waveguide has a hollow cylindrical structure with a first surface and a second surface at the opposite ends of the cylindrical structure and an external surface and an inner surface extending between the first surface and the second surface. The light source illuminates the first surface of the optical waveguide, the optical waveguide is recessed in the housing, and the external surface of the optical waveguide is constructed such that the light from the light source exit from the inner surface of the optical waveguide.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation. Many changes and modifications within the scope of the present disclosure may be made without departing from the spirit thereof, and the disclosure includes all such modifications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
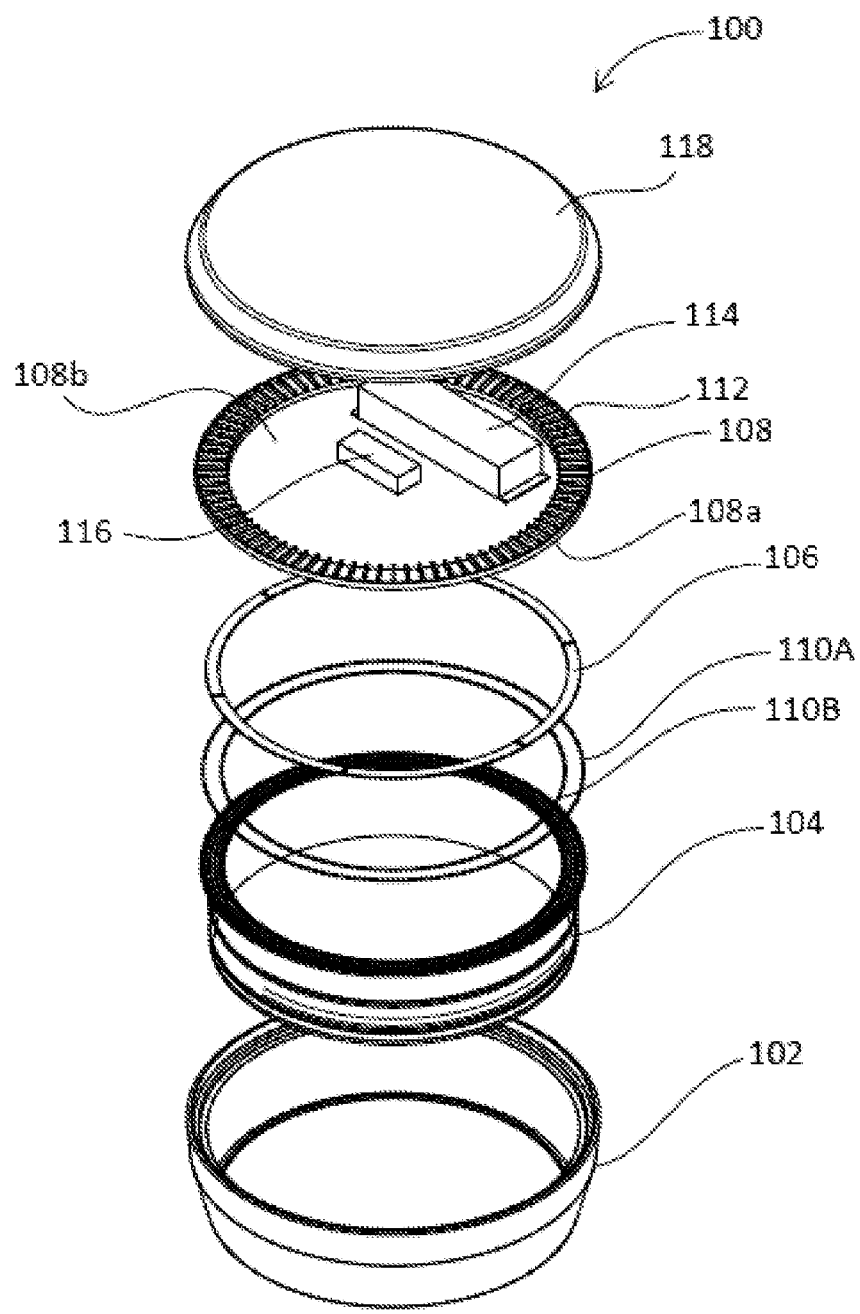
FIG. 1 illustrates an exploded view of an exemplary luminaire, in accordance with the embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE INVENTION

Hereinafter, the preferred embodiments of the present disclosure will be described in conjunction with the accompanying drawings, it should be understood that the preferred embodiments described herein are only used to illustrate and explain the present disclosure and are not intended to limit the present disclosure. While several examples are described in the description, modifications, adaptations, and other implementations are possible. Accordingly, the following detailed description is not limited by the disclosed examples.

References to "some embodiment", "an embodiment", "at least one embodiment", "one example", "an example", "for example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in some embodiment" does not necessarily refer to the same embodiment.

The present subject matter describes example luminaires for illuminating open and closed spaces. The luminaires of the present subject matter may include an optical waveguide having a hollow cylindrical structure. The optical waveguide has optical characteristics which guides the light travelling within the optical waveguide out through an inner surface of the cylindrical structure.

In accordance with an example implementation of the present subject matter, the optical waveguide has a first surface and a second surface at the opposite ends of the cylindrical structure and an external surface and an inner surface extending between the first surface and the second surface. A light source illuminates the first surface of the optical waveguide. The external surface of the optical waveguide is constructed such that light travelling within the optical waveguide exits the waveguide through the inner surface.

In accordance with the present subject matter, the light source may be any type of appropriate light source, such as, for example, an LED, a set of LEDs arranged in parallel or series, multiple sets of LEDs, one or more fluorescent lamps, one or more filament lamps, or one or more halogen lamps.

With the luminaires of the present subject matter, the light is directed in a cutoff region and the pattern of the optical waveguide distributes light in the direction of light propagation. As a result, the luminaires may direct more light towards the nadir region and may reduce glare.

The manner in which the luminaires shall be implemented is explained in detail with respect to FIG. 1 to FIG. 14B. It should be noted that the description and figures merely illustrate the principles of the present subject matter.

Figure 2:
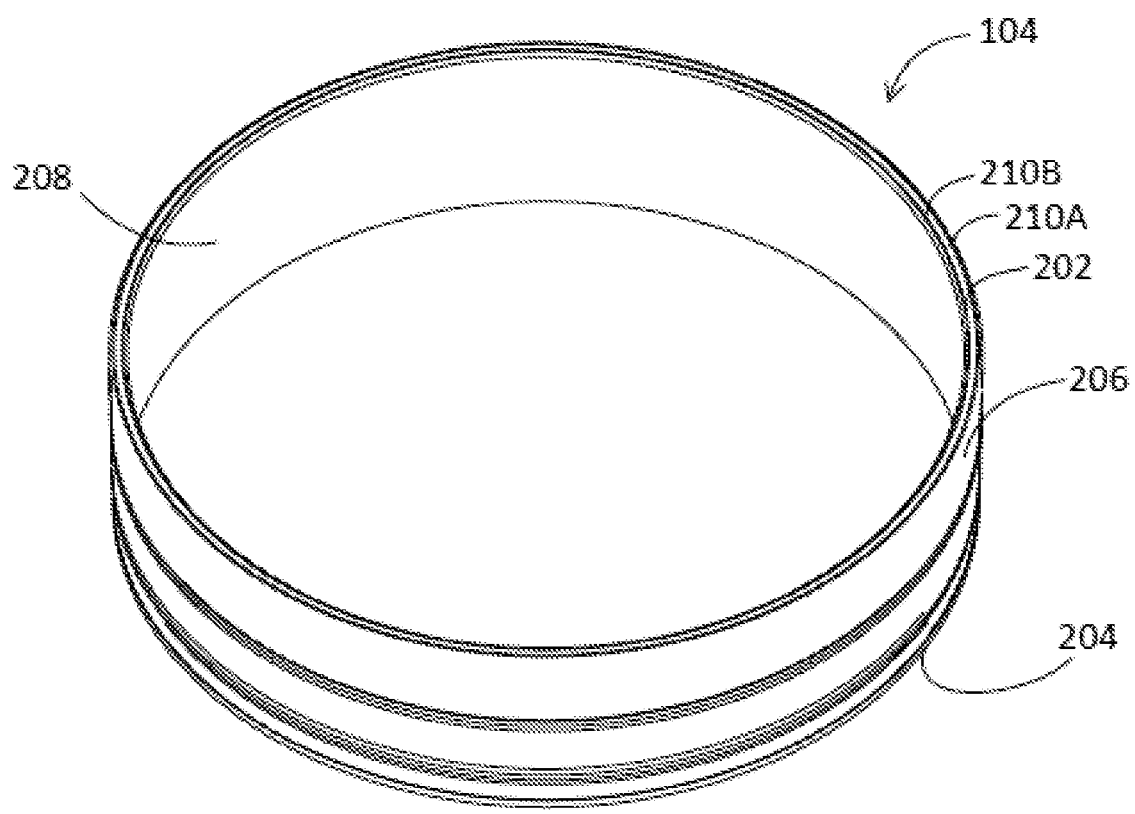
FIG. 2 illustrates a structure of an optical waveguide, in accordance with the embodiments of the present disclosure.

Referring to FIG. 1 and FIG. 2, FIG. 1 illustrates an exploded view of an exemplary luminaire 100, in accordance with the embodiments of the present disclosure. As shown in FIG. 1, the luminaire 100 includes a housing 102, an optical waveguide 104, a light source 106 to illuminate the optical waveguide 104. The optical waveguide 104 has a hollow cylindrical structure. FIG. 2 illustrates a structure of the optical waveguide 104, in accordance with the embodiments of the present disclosure. As shown in FIG. 2, the optical waveguide 104 has a first surface 202 and a second surface 204 at the opposite ends of the cylindrical structure. Further, the cylindrical structure defines an external surface 206 and an inner surface 208 extending between the first surface 202 and the second surface 204.

The light source 106 may illuminate either the first surface 202 or the second surface 204 of the optical waveguide 104. In another example implementation, light sources may be provided at opposite ends of the of the optical waveguide 104 to illuminate both the first surface 202 and the second surface 204 together.

The optical waveguide 104 may be a translucent plastic or a glass or any type of light transmissible material. For example, the optical waveguide 104 may be constructed from following material: polycarbonate, acrylic, borosilicate glass, or soda lime glass. The optical waveguide 104 works on a principal of internal reflection where the light travels within the optical waveguide 104 and exits from the waveguide when the light falls at the walls of the waveguide in specific range of angles.

A light ray may observe a total internal reflection when the light ray travelling within a waveguide falls at a wall of the waveguide at an angle higher than the critical angle with respect to an axis perpendicular to the plane of the wall. In case of a cylindrical waveguide, the plane will be tangent plane. Further, the light ray may pass though the wall when the light ray falls at an angle lower than the critical angle. The critical angle θ may obtained from the equation:

$$\sin\theta = \frac{\text{reflective index of air}}{\text{reflective index of optical waveguide}}.$$

Based on the above equation, the critical angle θ is dependent on the reflective index of the material used for the optical waveguide 104.

The external surface 206 has multiple light guiding points that direct the light rays, which are either coming directly from the light source or reflected by the inner surface 208, travelling within the optical waveguide 104 towards the inner surface 208 at the angles such that the light rays pass through the inner surface.

Referring to FIG. 1 and FIG. 2, the light source 106 is positioned at the first surface 202. The light source 106 has ring like structure which conforms to the geometry of the first surface 202 of the optical waveguide 104. In an example implementation, the light source may have a base with one or more LEDs arranged at the base. The base may be a print circuit board and the LED(s) are connected to the base through an electrical coupling. Alternatively, the LED(s) may be rigidly attached to the base without any electrical coupling and a separate electrical connection with the LED(s) is established using wires.

A cover plate 108 is positioned over the light source 106. The cover plate 108 has a first surface 108a and a second surface 108b. The first surface 108a of the cover plate 108 along with the gaskets 110A (external sealant) and 110B (internal sealant) seal the light source 106 over the first surface 202 of the optical waveguide 104. This prevents the light generating elements like LED(s) from damage or quality degradation due to external environmental factors like dust and humidity.

Figure 3:
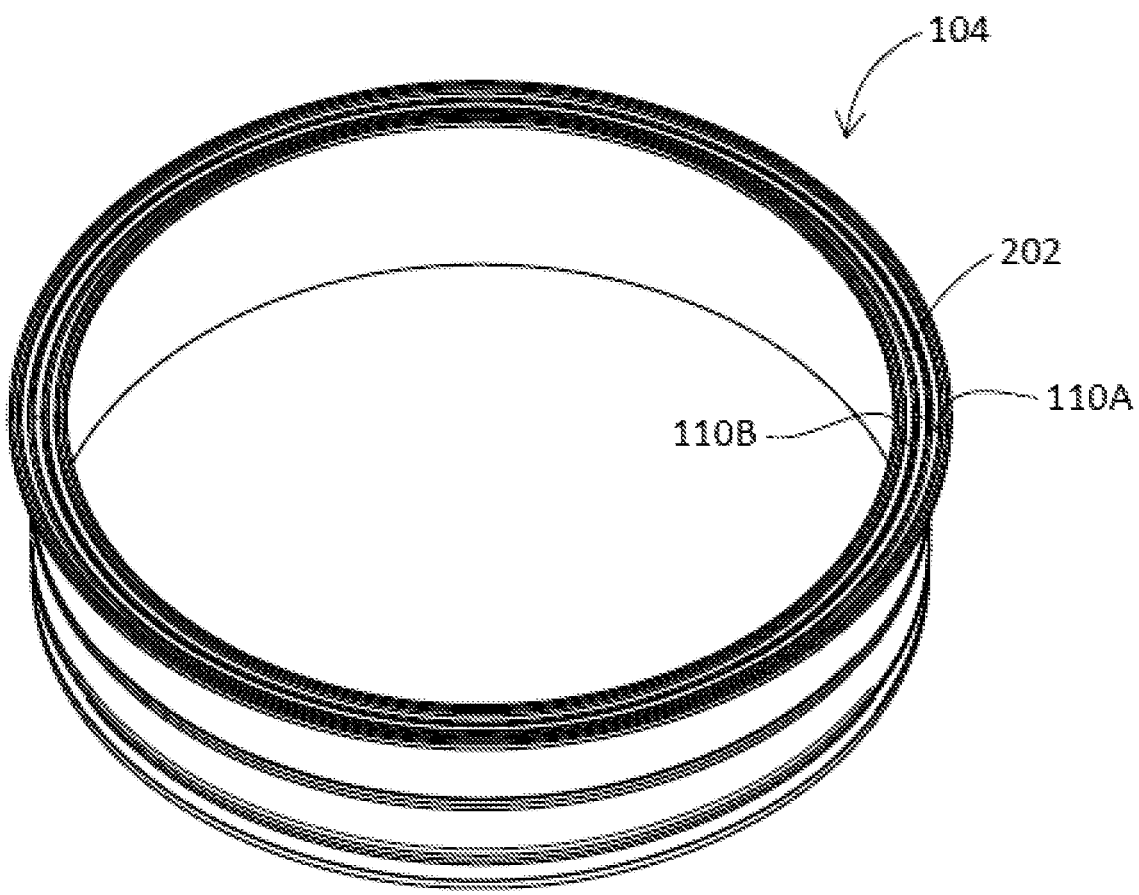
FIG. 3 illustrates the optical waveguide with gasket rings, in accordance with the embodiments of the present disclosure.

Outer channel 210A and inner channel 210B for receiving the gaskets 110A and 110B are defined at the outer and inner circumference of the first surface 202. FIG. 3 illustrates the optical waveguide 104 with gasket rings 110A and 110B, in accordance with the embodiments of the present disclosure.

Referring to FIG. 1, the second surface 108b of the cover plate has plurality of fins 112 protruding at the circumferential region of the cover plate. These fins 112 help in dissipating the heat produced by the light source 106. Further, the second surface 108b provides a base for mounting a control module 114 and sensor(s) 116. The control module 114 is electrically coupled to the light source 106 and may provide power to the light source 106 for illumination. In an example implementation, the cover plate 108 may have more than one sensor coupled to the control module 114.

In an example implementation, the control module 114 may be configured to provide constant power to the light source 106 during the time the control module 114 receives electrical supply from an external source or may be configured to provide power to the light source 106 for a predetermined time which may be based on occurrence of certain event(s). An event may be a detection of a motion of a person or an object or detection of quantum of ambient light in the surrounding or a pre-set amount of time. In another example implementation, the control module 114 may control the amount of current being supplied to the light source 106. Thus, the luminosity of the light source 106 may controlled through the control module 114. The control module 114 as described in the aforementioned embodiments may be implemented using a wide variety of suitable processes and system modules and is not limited to any particular analogue or digital circuitry, electronic chip, computer hardware, software, microcode, microprocessor, microcontroller, reduced instruction set computer (RISC), complex instruction set computer (CISC) or the like. Further, the control module 114 may be implemented as a hardware or software or a combination thereof.

The sensor(s) 116 is electrically coupled to the control module 114 and may control the switching of the light source 106 through the control module 114. The sensor 116 may be a motion sensor. The motion sensor may detect a motion of a person or an object, for example, a vehicle. Upon detection of a motion, the motion sensor may send a motion detection signal to the control module 114. In response, the control module may switch on the light source 106 by supplying the power. In an example implementation, the control module 114 may power the light source 106 for predetermined time after receiving motion detection signal. The control module 114 may continue to provide power supply to the light source 106 for another predetermined time when the motion detection signal is received by the control module 114 during switch on operation of the light source 106.

Alternatively, the motion sensor may avoid detection of motion when the control module 114 is supplying power to the light source 106. The motion sensor may avoid detection of motion for a period less than the predetermined time for which the control module 114 supplies power to the light source 106. This may prevent multiple switching operation of the light source 106 by the control module 114.

In an example implementation, the sensor 116 may be a light sensor to determine the ambient lighting condition and accordingly enables the control module 114 to manage luminance of the light source 106. For example, some amount of sunlight is present during evening or early morning, therefore, the light source 106 may work at fifty percent capacity of its total capacity for sufficient lighting and may work at full capacity during night. Similarly, the light source 106 may work at less capacity of their total capacity when some amount of light from other sources like luminaires are detected by the light sensor.

The light sensor may be a photoresistor, photodiode, a phototransistor, or a combination thereof. The light sensor may send a signal proportional to the amount of the ambient light detected to the control module 114. Based on the ambient light detected signal, the control module 114 may control the current supply to the light source 106 to adjust the light output. Further, the light sensor may periodically send ambient light detected signals to the control module 114 to maintain optimum lighting conditions for clear visibility.

The stack of optical waveguide 104, gaskets 110A and 110B, light source 106, and cover plate 108 are recessed in the housing 102. An enclosure lid 118 is secured to the housing 102 above the cover plate 108.

Figure 4:
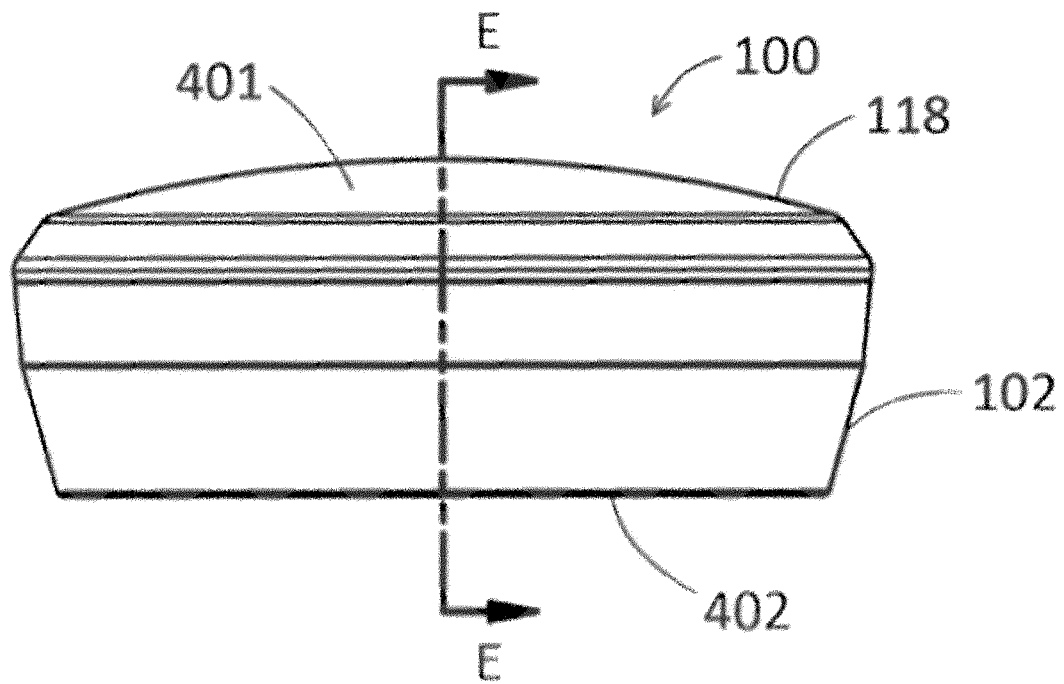
FIG. 4 illustrates a front view of the luminaire, in accordance with the embodiments of the present disclosure.

FIG. 4 illustrates a front view of the luminaire 100, in accordance with the embodiments of the present disclosure. The housing 102 and the enclosure lid 118 together protectively contain the optical waveguide 104, the light source 106, and the cover plate 108 along with the electronic components placed thereon. The housing 102 may have sufficient aperture to provide electrical connection of the control module 114 with an external power source. Thus, the housing 102 has a first end 401 and a second end 402 opposite to the first end where the first end 401 is closed and the second end 402 is open to provide a passage for the light exiting from the inner surface 208 of the optical waveguide 104. Further, the first surface 202 of the optical waveguide 104 and the light source 106 are positioned towards the first end.

Figure 5A:
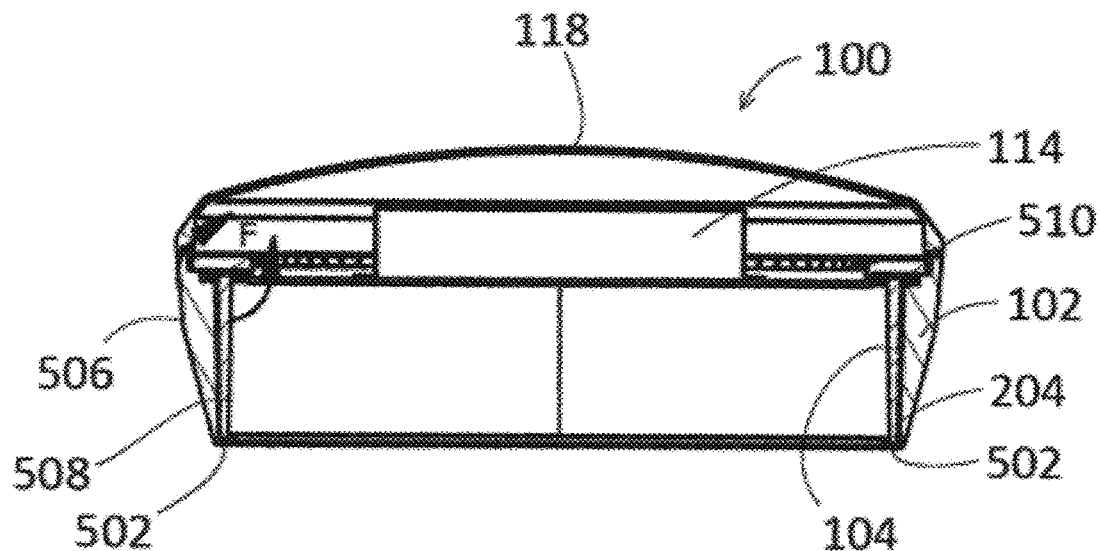
FIG. 5A illustrates a cross-section view of the luminaire at line E-E of FIG. 4, in accordance with the embodiments of the present disclosure.
Figure 5B:
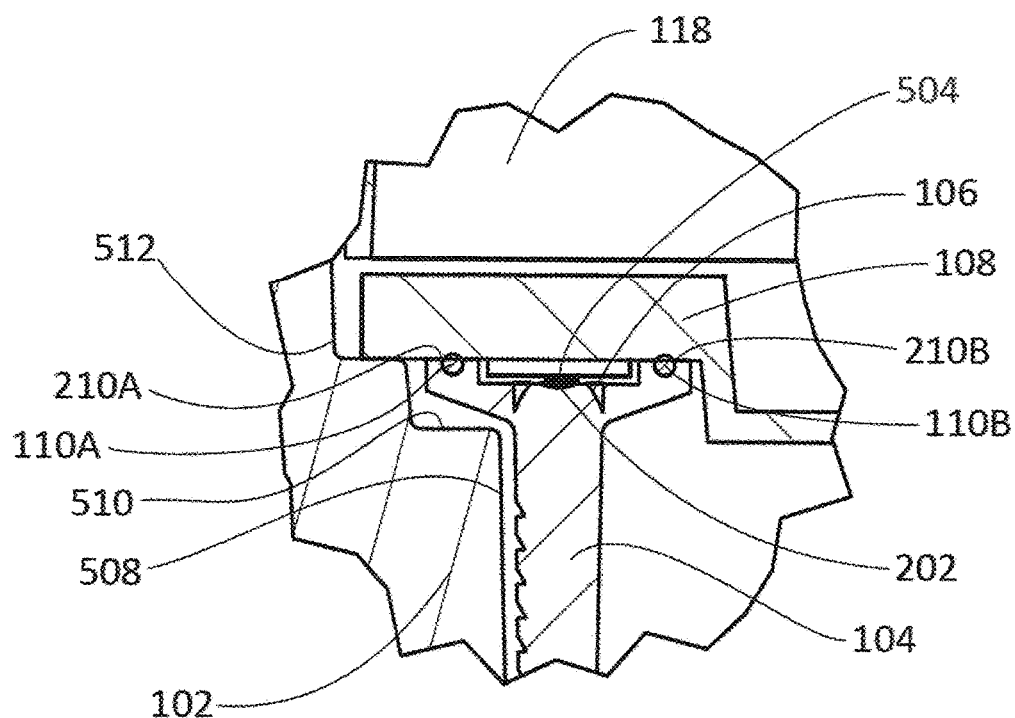
FIG. 5B illustrates a detail view of area F of FIG. 5A, in accordance with the embodiments of the present disclosure.

Referring to FIG. 4, E-E defines a vertical plane passing through the center of the luminaire 100. FIG. 5A illustrates a cross-section view of the luminaire 100 in the E-E plane, in accordance with the embodiments of the present disclosure. The cylindrical optical waveguide 104 is recessed in the housing 102. The housing 104 has inward edge 502 to support the optical waveguide 104 within the housing 102. Broken lines F encircles the arrangement of the elements in the luminaire 100. Referring to FIG. 5B, an enlarge view of the encircled area shows that an LED 504 is positioned over the first surface 202 of the optical waveguide 104. Gasket rings 110A and 110B are positioned in the channels 210A and 210B, respectively. The light source 106 is sealed between the optical waveguide 104, gasket rings 110A and 110B, and the cover plate 108.

The housing 102 has external housing wall 506 and internal housing wall 508. The internal wall 508 is tapered with plurality of steps formed towards housing end 510 for receiving the cover plate 108 and the enclosure lid 118. A first step 510 formed in the internal wall 508 forms a space for securing the first surface 202 of the optical waveguide 104 and the outer channel 210A formed at the outer circumference of the first surface 202. A second step 512 forms a space for securing the cover plate 108 in the housing 102.

As shown in FIG. 5A, the cover plate 108 is in contact with the second step 512. In an example embodiment, the cover plate 108 may be screwed to the housing 102 through the second step 512 or may be rigidly attached using clipping mechanisms.

Figure 6:
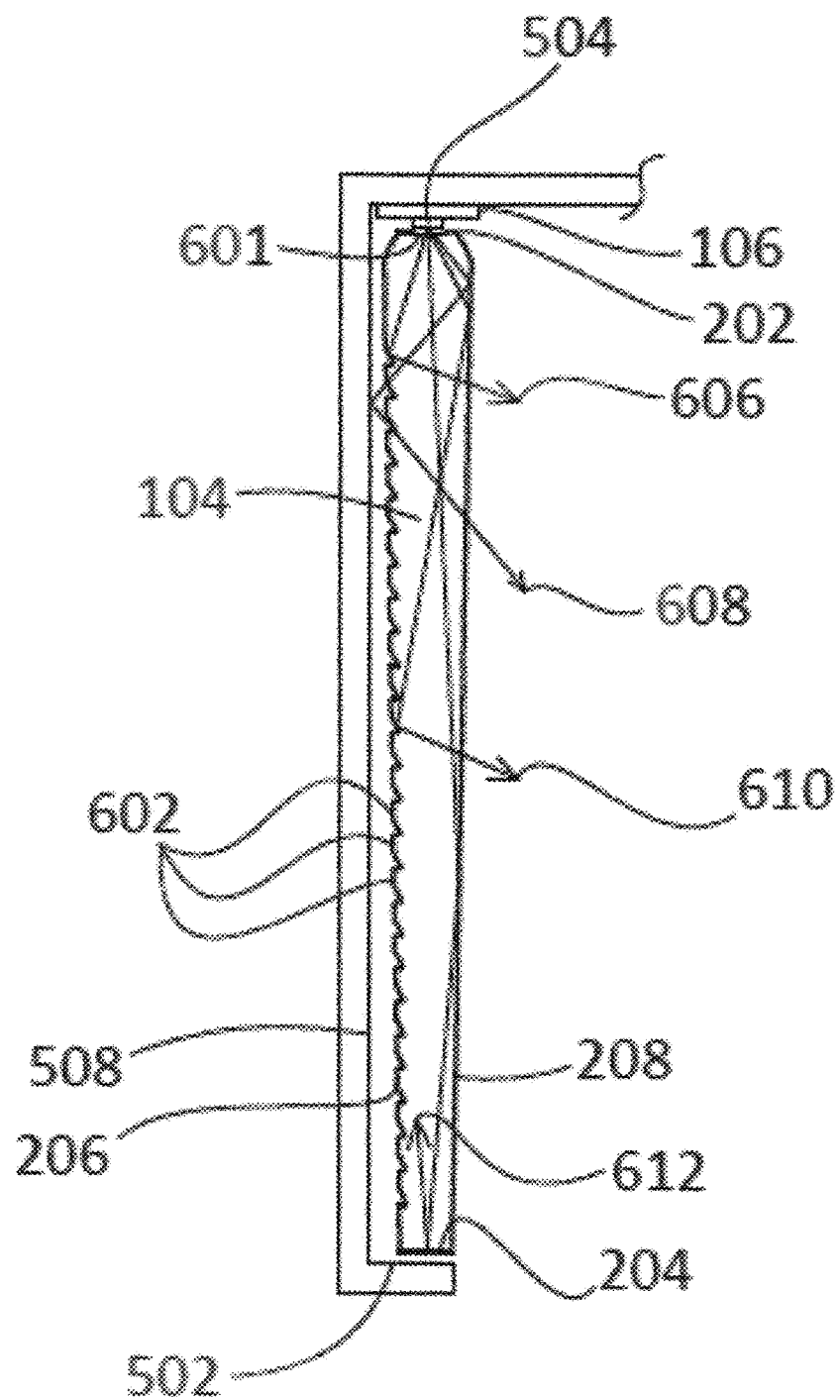
FIG. 6 illustrates light extraction feature of the optical waveguide, in accordance with the embodiments of the present disclosure.

Referring to FIG. 6, the light waves produced by the LED 504 are transferred to the optical waveguide 104 thought the first surface 202. FIG. 6 illustrates a light extraction feature of the optical waveguide 104, in accordance with the embodiments of the present disclosure. As shown in FIGS. 5A, 5B and 6. The LED(s) 504 are optically coupled to the first surface 202. The first surface 202 has a hemispherical curve 601 which allows the maximum amount of light from the LED(s) 504 of the light source 106 to enter the optical waveguide 104.

Once the light enters the optical waveguide 104, the light rays travelling within the optical waveguide may either hit the wall of the optical waveguide at the inner surface 208 or the wall at the external surface 206. The smooth inner surface 208 retains the direct light from the LED inside the waveguide, as the light is hitting the smooth inner surface 208 at a high angle (grazing), instead of passing through.

As shown in FIG. 6, the external surface 206 of the optical waveguide 104 is constructed such that the light from the light source 106 exits from the inner surface 208 of the optical waveguide. In an example implementation, the external surface 206 has a plurality of light guiding points 602, the plurality of light guiding points direct the light towards the inner surface. The light guiding points 602 are in the form of ribs or prisms. These ribs or prisms redirect the light out the inner surface 208. The light guiding points 602 may be etched on the external surface 206 of the optical waveguide or may be formed during the molding process. The molding process may be an injection molding and the molds may have required protrusions/designs that may form ribs/prisms at the external surface 206 of the optical waveguide.

In further embodiments the light extraction feature may further include reflective layers surrounding or associated with the external surface 206 and the second surface 204 of the optical waveguide 104. A first layer of reflective surface may surround the external surface 206 and a second layer of reflective surface may surround the second surface 204. In an example implementation, the internal wall 508 of the housing 102 may act as the first reflective layer and the internal edge 502 of the housing 102 may act as the second reflective layer. The internal wall 508 and the internal edge 502 of the housing 102 may be provided with a layer of paint to function as the reflective layers.

In another example implementation, sheets, for example, metallic, acrylic, polymer, etc., with the properties of reflecting light may be used as the reflective layers. The sheets may be installed between the housing 102 and the optical waveguide 104. A single sheet with bent edges may function as both the first reflective layer and the second reflective layer.

Further, there may exist a gap between the reflective layers and the optical waveguide 104 such that the reflective layers are not in direct contact with the external surface 206 and the second surface 204.

Referring to FIG. 6, the light rays from the LED(s) 504 that enter the optical waveguide 104 are directed to exit from the inner surface 208. For example, the light ray 606 from the LED 504 falls on one of the light guiding points 602. The rib/prism shaped light guiding point 602 at the external surface 206 redirects the light ray 606 towards the inner surface 208 at an angle lower than the critical angle such that the light ray may passthrough the inner surface 208 and exits the optical waveguide 104.

Light ray 608 falls at the inner surface 208 at an angle greater than the critical angle and is reflected towards the external surface 206. The light ray 608 exits the optical waveguide 104 through the external surface 206. However, the reflective layer formed on the internal wall 508 of the housing 102 reflects the light ray back into the optical waveguide 104 through the external surface 206 and towards the inner surface 208. Since the light ray 608 falls at the inner surface at an angle less than the critical angle, the light ray 608 may passthrough the inner surface 208 and exits the optical waveguide 104.

Light ray 610 falls at the inner surface 208 at an angle greater than the critical angle and is reflected towards the external surface 206. Thereafter, the light ray 610 exits the optical waveguide 104 is a similar way the light ray 606 exits the optical waveguide 104. However, the path followed by the light ray 610 is different from the path followed by the light ray 606.

Light ray 612 falls at the inner surface 208 at an angle greater than the critical angle and is reflected towards the second surface 204 of the optical waveguide 104. The light ray 612 exits the optical waveguide 104 through the second surface 204. However, the reflective layer formed inside the edge 502 of the housing 102 reflects the light ray back into the optical waveguide 104 and towards the external surface 206. The light ray 612 may exit the optical waveguide 104 through the inner surface 208 when the light ray 612 is redirected by the light guiding point 602.

In an example implementation, the light rays exiting the optical waveguide may either travel towards the cover plate 108 or away from the cover plate 108 and exiting through the aperture formed at the second surface 204 due to the cylindrical structure of the optical waveguide 104. The light rays travelling towards the cover plate 108 may be redirected towards the aperture by forming a reflective layer at the first surface 108a of the cover plate 108.

Further, light rays may bend when they pass from a medium of higher refractive index to a medium of lower refractive index. According to the present subject matter, the volume defined within the hollow cylindrical structure of the optical waveguide 104 is occupied by air which has a refractive index lower than the refractive index of the optical waveguide. Therefore, the light rays 606, 608, 610, 612 may get refracted when passing from one medium to another medium. However, for illustration purpose these light rays have been shown with straight line.

Figure 7:
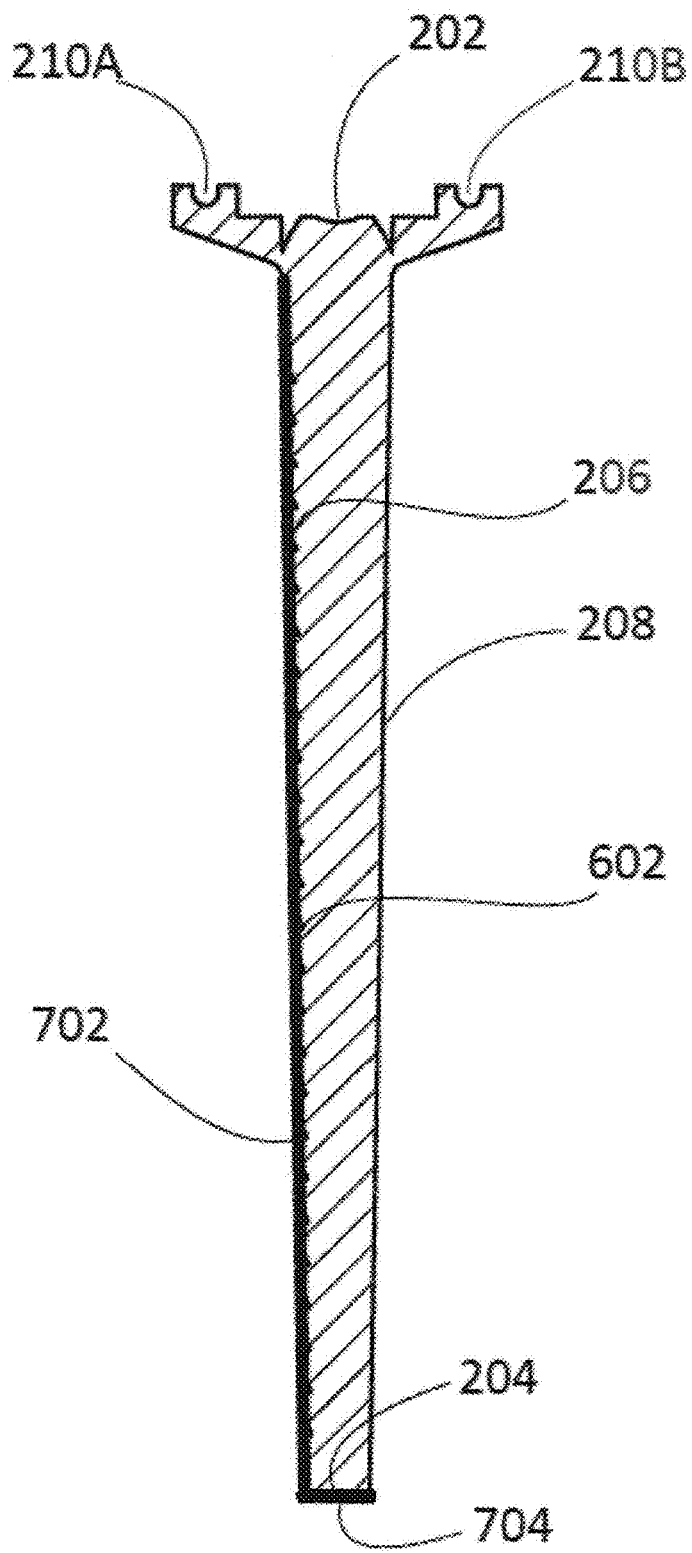
FIG. 7 illustrates another light extraction feature of the optical waveguide, in accordance with the embodiments of the present disclosure.

FIG. 7 illustrates another light extraction feature of the optical waveguide 104, in accordance with the embodiments of the present disclosure. In an example implementation, as shown in FIG. 7, reflective layers 702 and 704 may be provided directly over the external surface 206 and the second surface 204, respectively. Therefore, there exists no air gaps between the reflective layers 702 and 704 and the optical waveguide 104. Thus, the light guiding points in the optical waveguide 104 are the combination of the ribs/prims formed at the external surface 206 and the reflective layer 702.

Further, referring to FIGS. 6 and 7, the thickness of the optical waveguide 104 is gradually decreasing from the first surface 202 to the second surface 204 and forming a wedged shape. The wedged shape of the optical waveguide 104 may help in directing the light towards the second end of the housing 102. In an example implementation, the optical waveguide 104 may have uniform thickness from the first surface 202 to the second surface 204.

Figure 8A:
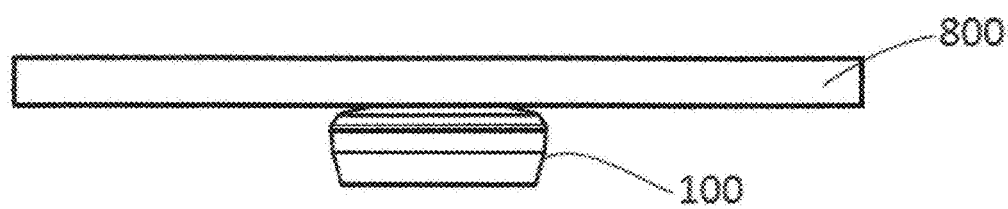
FIG. 8A illustrates a side view of a ceiling mounted luminaire, in accordance with the embodiments of the present disclosure.
Figure 8B:
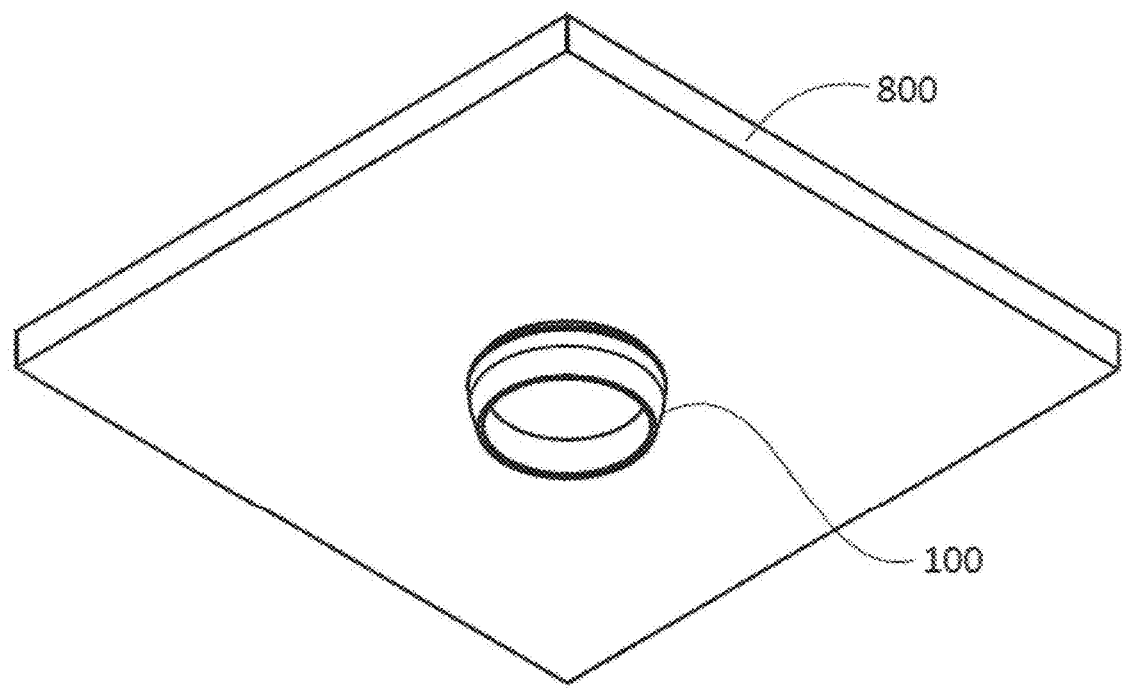
FIG. 8B illustrates a perspective view of the ceiling mounted luminaire of FIG. 8A, in accordance with the embodiments of the present disclosure.

The luminaire 100, as shown in FIG. 4, may be secured or mounted on the ceilings, walls, arms, posts, fans, etc. The enclosure lid 118 may be provided with suitable mounting brackets, plates, clamps, etc. Alternatively, the enclosure lid 118 may be hanged from the ceilings, arms, posts, etc. FIG. 8A and FIG. 8B illustrate a ceiling mounted luminaire, in accordance with the embodiments of the present disclosure. FIG. 8A illustrates a front view of the luminaire 100 mounted on the ceiling 800 and FIG. 8B illustrates a perspective view of the ceiling mounted luminaire. In an example implementation, the luminaire 100 may be mounted on the ceiling through a canopy.

Figure 9A:
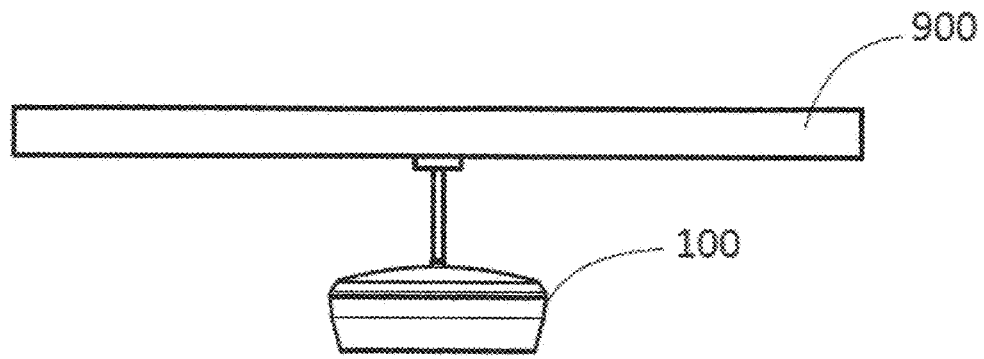
FIG. 9A illustrates a side view of a pendent mounted luminaire, in accordance with the embodiments of the present disclosure.
Figure 9B:
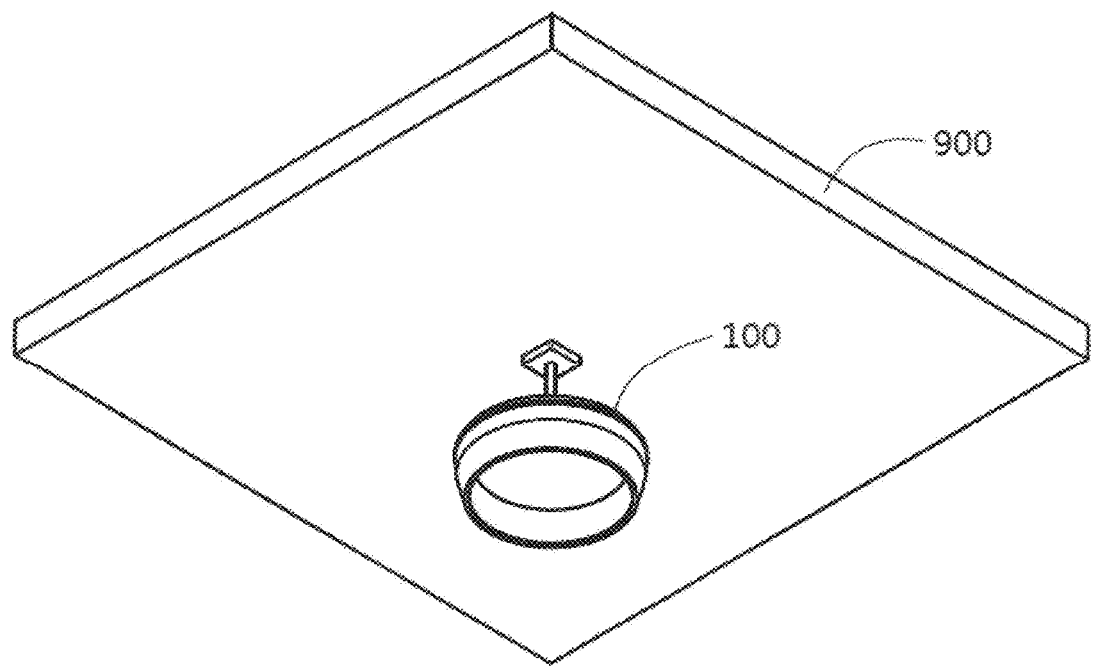
FIG. 9B illustrates a perspective view of the pendent mounted luminaire of FIG. 9A, in accordance with the embodiments of the present disclosure.

FIGS. 9A and 9B illustrate a pendent mounted luminaire, in accordance with the embodiments of the present disclosure. FIG. 9A illustrates a front view of the luminaire 100 as a pendant mount from the ceiling 900 and FIG. 9B illustrates a perspective view of the pendant mounted luminaire.

Figure 10A:
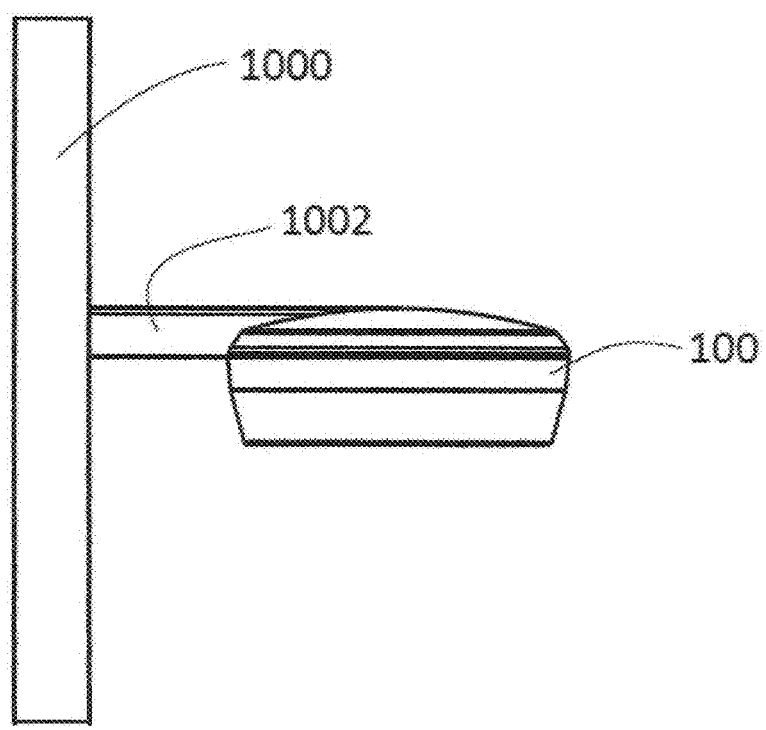
FIG. 10A illustrates a side view of a wall mounted luminaire, in accordance with the embodiments of the present disclosure.
Figure 10B:
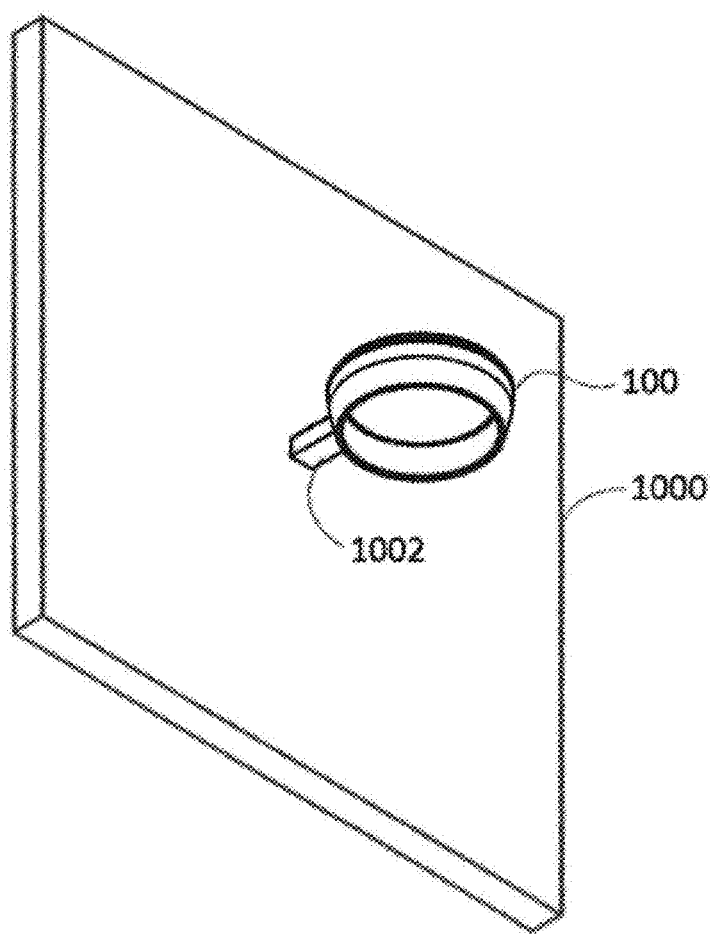
FIG. 10B illustrates a perspective view of the wall mounted luminaire of FIG. 10A, in accordance with the embodiments of the present disclosure.

FIG. 10A and FIG. 10B illustrate a wall mounted luminaire, in accordance with the embodiments of the present disclosure. FIG. 10A illustrates a side view of the luminaire 100 mounted on the wall 1000 through an arm 1002 and FIG. 10B illustrates a perspective view of the wall mounted luminaire. In an example implementation, the arm 1002 may be an integral part of the enclosure lid 118. In another example implementation, the arm 1002 and the enclosure lid 118 are removably coupled to each other. In another example implementation, the arm 1002 may be coupled to the external wall 506 of housing 102.

Figure 11A:
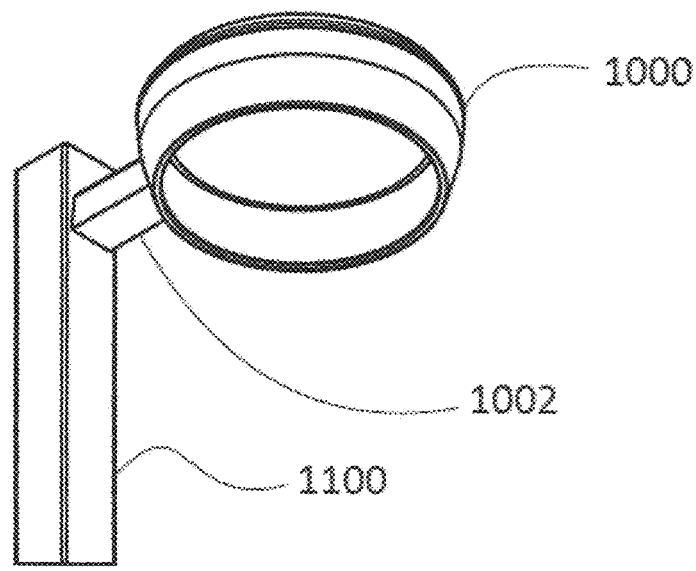
FIG. 11A illustrates a pole mounted luminaire, in accordance with the embodiments of the present disclosure.
Figure 11B:
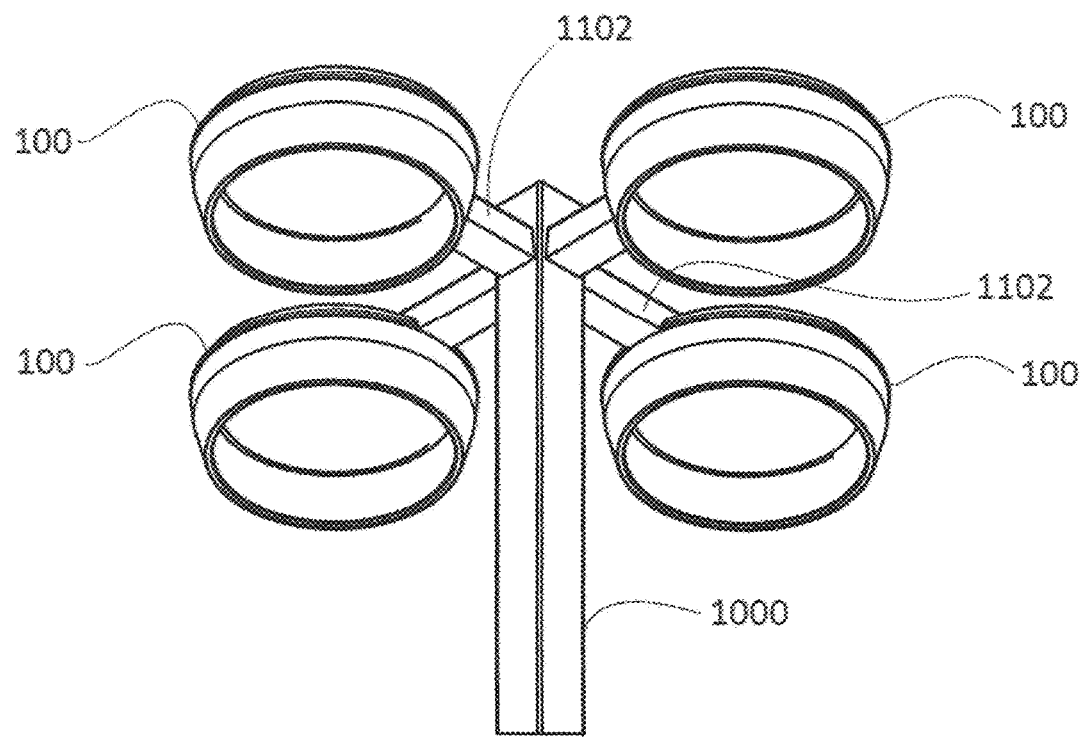
FIG. 11B illustrates pole mounted luminaires, in accordance with the embodiments of the present disclosure.

FIG. 11A and FIG. 11B illustrate pole mounted luminaire(s), in accordance with the embodiments of the present disclosure. FIG. 11A illustrates a perspective view of the luminaire 100 mounted on a pole 1100 through an arm 1102. FIG. 11B illustrates a perspective view of multiple luminaires 100 mounted on the pole 1100. Each luminaire 100 is mounted on the pole through their respective arm 1102.

Figure 12:
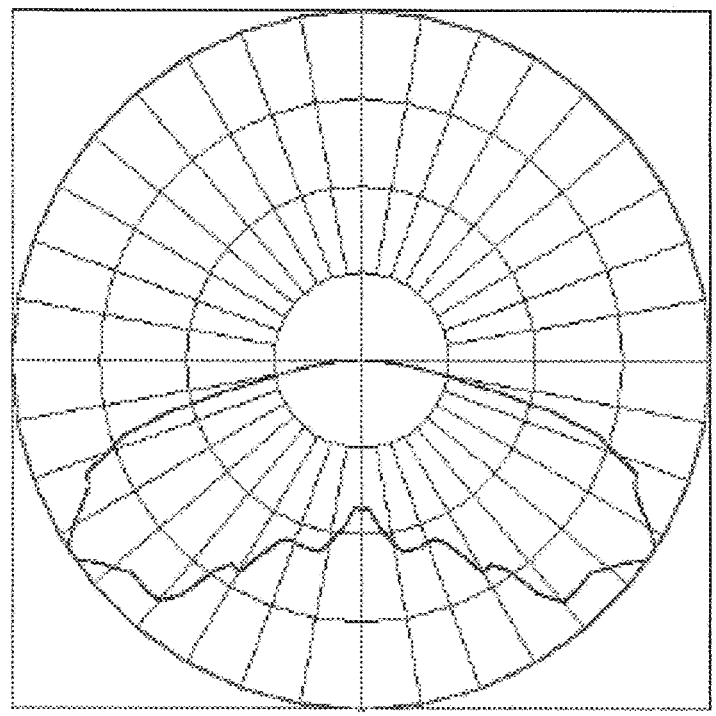
FIG. 12 a light distribution chart, in accordance with the embodiments of the present disclosure.

FIG. 12 a light distribution chart, in accordance with the embodiments of the present disclosure. The solid line 1200 on the distribution chart indicates the light distribution curve formed by the luminaires of the present subject matter in a vertical plane. The light distribution curve 1200 is symmetrical in the opposite direction and within a vertical angle of up to 90° above nadir. Further, the light distribution curve 1200 indicate that sufficient luminance is provided at the nadir. Therefore, the various implementations of the luminaires, as shown in FIG. 8 to FIG. 11, of the present subject matter create a beam pattern with uniform distribution of light and in full-cutoff region. The luminaires of the present subject matter produce sufficient lighting with reduced glare. As a result, person(s) in the vicinity of the luminaire may observer smooth viewing experience.

Further, in an example implementation, the housing 102 may be provided with a diffuser at the second end. The diffuser may further create a soft light effect.

Figure 13A:
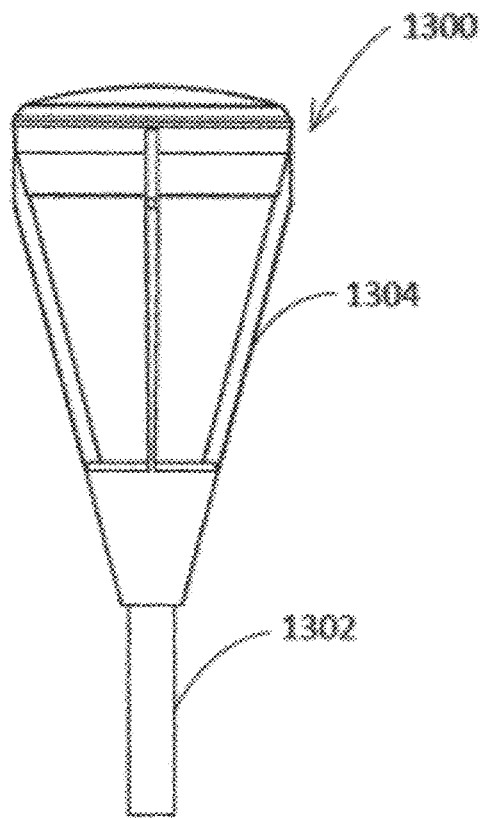
FIG. 13A illustrates a side view of a lamp post mounted luminaire, in accordance with the embodiments of the present disclosure.
Figure 13B:
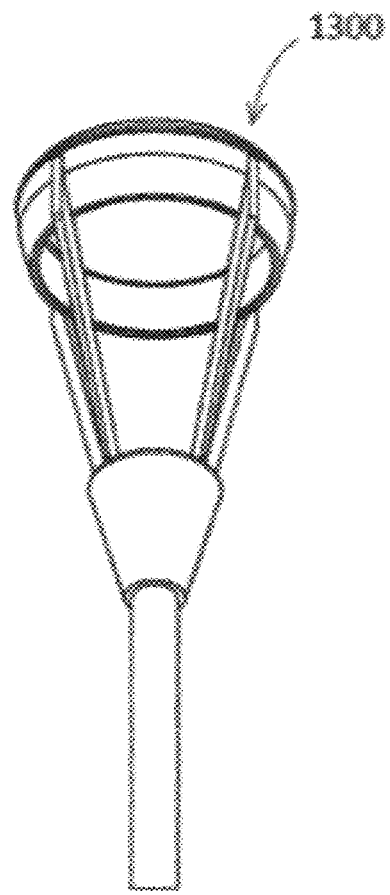
FIG. 13B illustrates a perspective view of the lamp post mounted luminaire of FIG. 13A, in accordance with the embodiments of the present disclosure.

In another example implementation, FIG. 13A and FIG. 13B illustrate a lamp post 1300, in accordance with the embodiments of the present disclosure. FIG. 13A illustrates a front view of the lamp post 1300 and FIG. 13B illustrates a perspective view of the lamp post 1300. The lamp post 1300 comprises the luminaire 100. The luminaire 100 is mounted on a pole 1302 with support of the arms 1304.

Figure 14A:
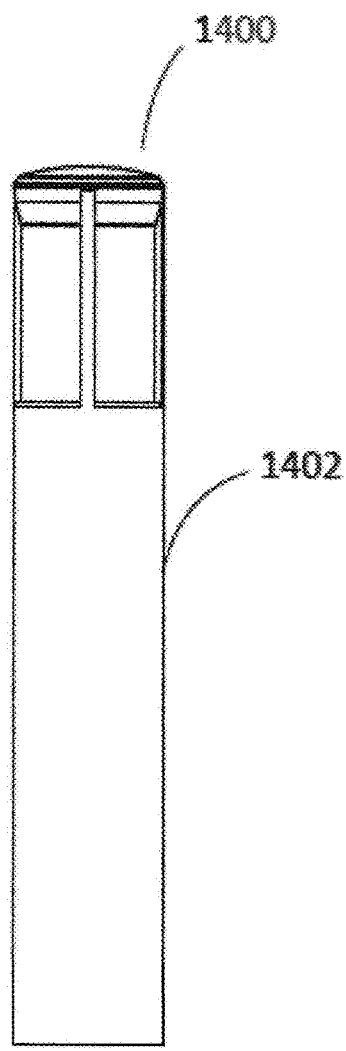
FIG. 14A illustrates a side view of a bollard light, in accordance with the embodiments of the present disclosure.
Figure 14B:
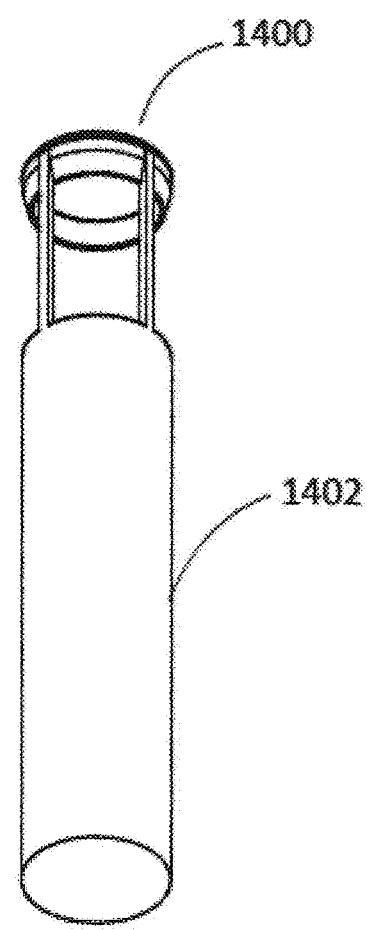
FIG. 14B illustrates a perspective view of the bollard light of FIG. 14A, in accordance with the embodiments of the present disclosure.

In another example implementation, FIG. 14A and FIG. 14B illustrate a bollard light 1400, in accordance with the embodiments of the present disclosure. FIG. 14A illustrates a front view of the bollard light 1400 and FIG. 14B illustrates a perspective view of the bollard light 1400. The bollard light 1400 has the luminaire 100 mounted over a column 1402.

A person having ordinary skills in the art will appreciate that the lighting system, components, and sub-components, and various elements of the system have been illustrated and explained to serve as examples and should not be considered limiting in any manner. It will be further appreciated that the variants of the above disclosed system elements, or modules and other features and functions, or alternatives thereof, may be combined to create other different systems or applications.

While aspects of the present disclosure have been particularly shown, and described with reference to the embodiments above, it will be understood by those skilled in the art that various additional embodiments may be contemplated by the modification of the disclosed apparatuses, systems, and devices without departing from the spirit and scope of what is disclosed. Such embodiments should be understood to fall within the scope of the present disclosure as determined based upon the claims and any equivalents thereof.

What is claimed is:

1. A luminaire, comprising:
   an optical waveguide having a hollow cylindrical structure with a first surface and a second surface at the opposite ends of the cylindrical structure and an external surface and an inner surface extending between the first surface and the second surface;
   a light source to illuminate the first surface of the optical waveguide, wherein the external surface of the optical waveguide is constructed such that the light from the light source exits from the inner surface; and
   a first layer surrounds the external surface to the reflect the light towards the inner surface.

2. The luminaire as claimed in claim 1, wherein the light source comprises at least one light emitting diode (LED).

3. The luminaire as claimed in claim 1, wherein a second layer covers the second surface to reflect the light falling over the second surface.

4. The luminaire as claimed in claim 1, wherein the layer is a paint or a sheet.

5. The luminaire as claimed in claim 3, wherein the layer is a paint or a sheet.

6. The luminaire as claimed in claim 1, wherein the external surface is etched to form a plurality of light guiding points, the plurality of light guiding points direct the light towards the inner surface.

7. The luminaire as claimed in claim 1, wherein the optical waveguide is recessed in a housing, and wherein:
   the housing has a first end and a second end opposite to the first end, the first end is closed; and
   the first surface of the optical waveguide and the light source are positioned towards the first end.

8. The luminaire as claimed in claim 7, wherein the housing further comprises a control module to control and supply power to the light source.

9. The luminaire as claimed in claim 7, wherein a layer surrounds the external surface of the optical wave guide to reflect the light towards the inner surface and wherein the layer is an integral part of the housing.

10. The luminaire as claimed in claim 7, wherein the housing further comprises:
    a cover plate disposed over the light source; and
    an external sealant and an internal sealant to seal the light source between the optical waveguide and the cover plate.

11. The luminaire as claimed in claim 7, wherein the housing is mounted on a post.

12. The luminaire as claimed in claim 7, wherein the housing is mounted on a surface through an arm.

13. The luminaire as claimed in claim 8, wherein the housing is suspended from a ceiling.

14. A luminaire, comprising:
    a housing;
    an optical waveguide having a hollow cylindrical structure with a first surface and a second surface at the opposite ends of the cylindrical structure and an external surface and an inner surface extending between the first surface and the second surface, wherein the optical waveguide is recessed in the housing;
    a plurality of light emitting diodes (LEDs) to illuminate the first surface of the optical waveguide, wherein the external surface of the optical waveguide is constructed such that the light from the plurality of LEDs exits from the inner surface; and
    a first layer surrounds the external surface to the reflect the light towards the inner surface.

15. The luminaire as claimed in claim 14, wherein the housing has a first end and a second end opposite to the first end, wherein the first end is closed, and wherein the first edge of the optical waveguide and the plurality of LEDs are positioned towards the first end.

16. The luminaire as claimed in claim 14, wherein the housing further comprises a control module to control and supply power to the plurality of LEDs.

17. The luminaire as claimed in claim 14, wherein a layer surrounds the external surface of the optical wave guide to reflect the light towards the inner surface of the optical wave guide.

18. The luminaire as claimed in claim 17, wherein the layer is a paint or a sheet.

19. The luminaire as claimed in claim 17, wherein the layer is an integral part of the housing.

20. A lamp post, comprising:
a housing;
a light source provided in the housing;
an optical waveguide having a hollow cylindrical structure with a first surface and a second surface at the opposite ends of the cylindrical structure and an external surface and an inner surface extending between the first surface and the second surface, wherein the light source illuminates the first surface of the optical waveguide, the optical waveguide is recessed in the housing, the external surface of the optical waveguide is constructed such that the light from the light source exit from the inner surface of the optical waveguide; and
a first layer surrounds the external surface to the reflect the light towards the inner surface.

* * * * *